US010882663B2

(12) United States Patent
Hartl

(10) Patent No.: US 10,882,663 B2
(45) Date of Patent: Jan. 5, 2021

(54) SIDE WALL ARRANGEMENT FOR A CONTAINER AND METHOD FOR THE PRODUCTION THEREOF AND CONTAINER HAVING SUCH A SIDE WALL ARRANGEMENT

(71) Applicant: Infinex Holding GmbH, Haiterbach (DE)

(72) Inventor: Martin Hartl, Horb (DE)

(73) Assignee: Infinex Holding GmbH, Haiterbach (DE)

( * ) Notice: Subject to any disclaimer, the term of this patent is extended or adjusted under 35 U.S.C. 154(b) by 229 days.

(21) Appl. No.: 15/659,710

(22) Filed: Jul. 26, 2017

(65) Prior Publication Data

US 2018/0050837 A1    Feb. 22, 2018

(30) Foreign Application Priority Data

Aug. 16, 2016  (DE) .................. 10 2016 115 215

(51) Int. Cl.
  *B65D 19/18*    (2006.01)
  *B65D 19/38*    (2006.01)
  (Continued)

(52) U.S. Cl.
  CPC ............ *B65D 25/005* (2013.01); *B29C 65/02* (2013.01); *B65D 19/18* (2013.01); *B65D 19/38* (2013.01);
  (Continued)

(58) Field of Classification Search
  CPC ...... B65D 19/18; B65D 19/38; B65D 25/005; B65D 2519/00034; B65D 2519/00069;
  (Continued)

(56) References Cited

U.S. PATENT DOCUMENTS 4,192,430 A * 3/1980 Cornou .................. B65D 19/18
  220/1.5
4,917,255 A * 4/1990 Foy ....................... B65D 25/005
  220/6
(Continued)

FOREIGN PATENT DOCUMENTS

CN   105 035 569 A    11/2015
DE    43 39 911 A1    5/1995
(Continued)

OTHER PUBLICATIONS

European Search Report for corresponding European Patent Application No. 17 17 9254 dated Dec. 19, 2017.

*Primary Examiner* — Andrew D Perreault
(74) *Attorney, Agent, or Firm* — Renner, Otto, Boisselle & Sklar, LLP

(57) ABSTRACT

The invention relates to a side wall arrangement for a container and a method for the production thereof and a container, in particular a pallet container, which comprises several side walls (16) that can be connected to one another on their narrow sides assigned to one another of the side walls (16) by means of a joint (18) or are connected to one another, such that a closed ring (14) is formed from the side walls (16) that can be folded together, wherein a loading hatch (19) is provided on the at least one side wall (16), said loading hatch (19) closing an opening (27) in a closed position (22), said opening (27) being open towards an end edge (37) of the side wall (16), and wherein the loading hatch (19) is flexibly connected to the side wall (16) by means of a hinge (21), wherein side edges (42) of the loading hatch (19) which border it in terms of width and side edges (43) of the side wall (16) which border the opening (27) in the side wall (16) are reduced in terms of wall thickness relative to its adjacent wall sections (28, 29) of the side wall (16) and the loading hatch (19) on at least one side edge (43)

(Continued)

Figure 1:
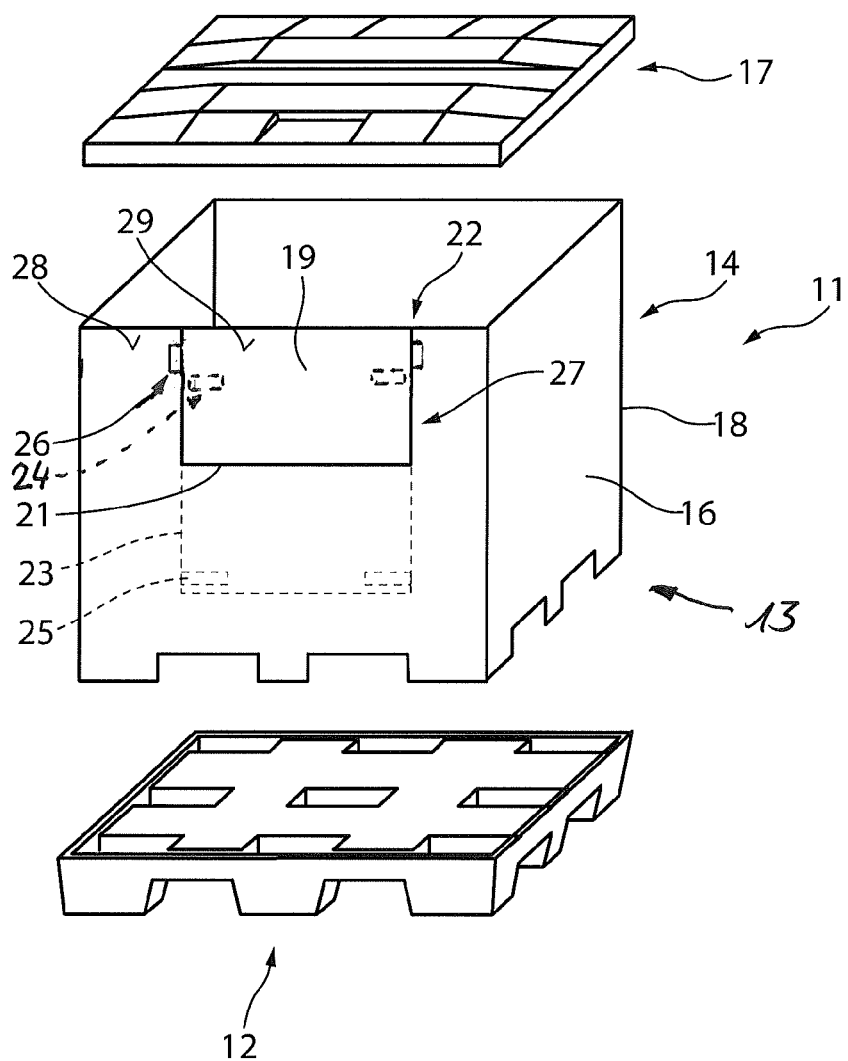

of the side wall (16) or at least one side edge (42) of the loading hatch (19), at least one tab (31) is provided which extends beyond the opposite side edge (42, 43) of the loading hatch (19) or the side wall (16) and can be transferred into the open position (23) or closed position (22) when opening and closing the loading hatch (19) after overcoming a holding force produced by the tab (31) or after overcoming a holding force produced by corner regions (51) of the side wall (16) projecting into the opening (27) and, in the closed position (22), the side edge (42) is positioned in the upper corner region (52) of the loading hatch (19) between the side edge (43) of the side wall (16) and the tab (31) positioned in the side wall (16) or the side edge (43) is positioned in the upper corner region (51) of the side wall (16) between the side edge (42) of the loading hatch (19) and the tab (31) that is arranged on the loading hatch (19).

20 Claims, 5 Drawing Sheets

(51) Int. Cl.
 B29C 65/02 (2006.01)
 B65D 25/00 (2006.01)
 *B29L 31/00* (2006.01)
(52) U.S. Cl.
 CPC .............. *B29L 2031/7178* (2013.01); *B65D 2519/00034* (2013.01); *B65D 2519/00069* (2013.01); *B65D 2519/00174* (2013.01); *B65D 2519/00208* (2013.01); *B65D 2519/00273* (2013.01); *B65D 2519/00338* (2013.01); *B65D 2519/00492* (2013.01); *B65D 2519/00497* (2013.01); *B65D 2519/00537* (2013.01); *B65D 2519/00592* (2013.01); *B65D 2519/00641* (2013.01); *B65D 2519/00711* (2013.01); *B65D 2519/00805* (2013.01); *B65D 2519/00915* (2013.01)

(58) Field of Classification Search
 CPC ........... B65D 2519/00174; B65D 2519/00208; B65D 2519/00273; B65D 2519/00338; B65D 2519/00492; B65D 2519/00497; B65D 2519/00537; B65D 2519/00592; B65D 2519/00641; B65D 2519/00711; B65D 2519/00805; B65D 2519/0091; B65D 2519/00915; B65D 5/16; B65D 7/40; B65D 43/16; B65D 43/22; B29C 65/02; B29L 2031/7178
 USPC ............................................... 220/6; 206/386
 See application file for complete search history.

(56) References Cited

U.S. PATENT DOCUMENTS

| | | | | |
|---|---|---|---|---|
| 5,161,709 | A * | 11/1992 | Oestreich, Jr. | B65D 19/12 220/1.5 |
| 5,711,444 | A * | 1/1998 | Meacham | B65D 11/1833 220/1.5 |
| 5,829,595 | A | 11/1998 | Brown et al. | |
| 9,938,053 | B2 * | 4/2018 | Wintrich | B65D 19/02 |
| 2007/0075077 | A1 * | 4/2007 | Dubois | B65D 19/12 220/1.5 |
| 2015/0197971 | A1 * | 7/2015 | Jian | B65D 25/005 220/4.28 |
| 2015/0203255 | A1 | 7/2015 | Wintrich et al. | |
| 2019/0092529 | A1 * | 3/2019 | Su | B65D 5/0045 |

FOREIGN PATENT DOCUMENTS

| | | |
|---|---|---|
| DE | 20 2005 009 037 U1 | 8/2006 |
| DE | 20 2005 009037 U1 | 8/2006 |
| DE | 10 2006 005 873 A1 | 8/2007 |
| DE | 20 2011 004 759 U1 | 5/2011 |
| DE | 10 2012 220 023 B3 | 12/2013 |
| DE | 10 2015 100 085 A1 | 7/2015 |
| WO | 2012/115561 A1 | 8/2012 |
| WO | 2012/155561 A1 | 11/2012 |

* cited by examiner

SIDE WALL ARRANGEMENT FOR A CONTAINER AND METHOD FOR THE PRODUCTION THEREOF AND CONTAINER HAVING SUCH A SIDE WALL ARRANGEMENT

This application claims priority of German Patent Application No. 10 2016 115 215.3 filed Aug. 16, 2016, which is hereby incorporated herein by reference.

The invention relates to a side wall arrangement for a container, in particular a pallet container, which comprises several side walls that are able to be connected to one another on their side edges allocated to one another by means of a joint or are connected to one another, such that these form a closed ring and are able to be folded together. The invention further relates to a method for the production of such a side wall arrangement and a container that comprises such a side wall arrangement.

Such a side wall arrangement for a container or such a container is known from DE 20 2005 009 037 U1. This container consists of a pallet base, a ring made of several side walls and a cover. A loading hatch is provided on at least one side wall of the container, said loading hatch, when in a closed position, closing an opening in the side wall and being flexibly connected to the side wall. The loading hatch is held in a closed position at least by means of a shutter. The shutter has two tabs arranged to be spaced apart from each other which form a latching section. Separating points are formed between the loading hatch and the side wall. The shutter is shiftably fixed on a wall section of the loading hatch or side wall, wherein, after a shifting movement into a closed position, the latching section is aligned in such a way that it extends beyond the separating point and encompasses the wall section of the side wall or loading hatch opposite the separating point in the closed position.

Furthermore, a side wall arrangement for a pallet container is known from DE 10 2015 100 085 A1 in which an opening is provided on at least one side wall of the side wall arrangement, said opening being able to be closed by means of a loading hatch. A counter bracket is provided on the side wall or the loading hatch for holding the loading hatch in the closed position, out of which counter bracket a holding section extends that is arranged in a separating point between the wall section of the side wall and the wall section of the loading hatch and receives a holding body that is positioned opposite the counter bracket. In doing so, a part of the shutter is provided in the separating point when the loading hatch is in a closed position relative to the side wall. To open and close the loading hatch relative to the side wall, it is necessary that the loading hatch can be moved into the open position and into the closed position by overcoming a counter forced exerted by the holding body. The holding body of the shutter engages with two opposing end faces of the wall sections that point into the separating points.

The object of the invention is to propose a side wall arrangement for a container, in particular a pallet container, that allows a simple opening and closing of the loading hatch and secures the loading hatch in the closed position independently of the side wall. The object of the invention is to further propose a method by means of which a simple production of a loading hatch in a side wall is created that enables a simple opening and closing, wherein the loading hatch is secured in the closed position independently of the side wall. The object of the invention is to further propose a container, in particular a pallet container, that comprises such a side wall arrangement having a loading hatch.

The object is solved by means of a side wall arrangement in which side edges, which border the loading hatch in width, and side edges of the side wall, which border the opening, in which wall thicknesses relative to the adjacent wall sections of the side wall and loading hatch are reduced and at least one side edge of the side wall or the loading hatch has a tab which extends from the allocated side edge beyond the opposing side edge of the loading hatch or side wall and is aligned and spaced apart relative to the allocated side edge such that, when opening and closing the loading hatch after overcoming a holding force produced by the tab or after overcoming a holding force produced by the corner regions that project into the opening, it can be transferred into the open and closed position and the loading hatch is positioned in the closed position having at least one side edge of the loading hatch in the upper corner region of the loading hatch, between the side edge of the side wall and a tab arranged on the side wall, or a side edge of the side wall is positioned at least in the upper corner region of the side wall between the side edge of the loading hatch and the tab arranged on the loading hatch. The upper corner region of the loading hatch is formed by means of an end edge of the loading hatch and the side edge which border each other. The upper corner region of the side wall is formed by means of the end edge and the side edge of the side wall allocated to the opening. As a result of this arrangement, a shutter for the loading hatch is formed in the side wall that requires no additional actuation to open and close the loading hatch. Rather, the loading hatch can be opened by a movement in an opening direction and closed by a movement in a closing direction. In the closed position, the loading hatch is positioned on the side wall in a self-holding manner. An upper corner region of the side wall, which borders the opening or points to the opening, projects into the original surface of the opening after introducing a separation cut in the side wall for cutting the loading hatch free; said opening corresponds to the surface of the loading hatch. As a result, when closing the loading hatch, this can be prevented from falling inwards. Alternatively, as a result of the tab arranged on the loading hatch or the side wall, the loading hatch can be prevented from falling inwards when closing the opening in the side wall. Surprisingly, it has proved successful that a pretension in the side wall is formed by introducing stamping for reducing the wall thickness of the side edges of the side wall and the opposing side edges of the loading hatch, said pretension being relieved after introducing the separation cuts for forming the loading hatch by the upper corner regions of the side wall that point to the opening extending slightly into the opening, such that a reduction of the opening width between the upper corner regions of the side wall emerges. As a result, either the loading hatch is prevented from falling inwards and thus a stop is formed or the upper corner region of the side wall acts as a locking element.

A preferred embodiment of the side wall arrangement provides that the tab can be fixed on an outside or an inside of the side wall or the loading hatch. For example, the tab can be adhered, welded or fixed by means of riveting, latching, clipping or similar to the outside or inside of the side wall.

It is preferred that the tab is stamped on an outside or an inside of the side wall or the loading hatch. As a result, the tab is moulded on the side wall or the loading hatch in one piece and can be adjusted by means of thermal deformation. Otherwise, no further component is required for the application. In addition, there is good recycling capability.

A preferred embodiment of the tab on the side wall or loading hatch provides that this is aligned in parallel to the side edge to which the tab is allocated, such that the tab is arranged on a parallel plane to the side edge. As a result, a shutter can be created that extends within the wall thickness of the side wall.

A further preferred embodiment of the side wall arrangement provides that the side edge of the side wall or the loading hatch is broken in the region of the tab to the extent of the length of the tab. As a result, on the one hand, stamping the tab can take place in a simple manner. On the other hand, a simple opening and closing of the loading hatch can thus be obtained.

The tab is preferably flake-shaped and elastically flexible such that a side edge can be guided past by overcoming a counter force to open and close the loading hatch and hold the loading hatch in the closed position.

It is preferred that the side edges of the side wall or the loading hatch opposite the tab extend continuously from the hinge up to the end edge of the loading hatch or side wall or the ring. As a result, simple geometric properties are created.

Furthermore, the wall thickness of the side edges of the side wall and the loading hatch is reduced by a stamping and is preferably formed by symmetrical stamping of the inside and outside of the side wall and the loading hatch. By reducing the wall thickness in the region of the side edge in comparison to the adjacent wall sections of the side wall and the loading hatch, with the existing wall thickness of the side wall, a distance formed between the tab and a side edge, whereby a gap is formed, can suffice in order to receive the opposing side edge of the side wall or the loading hatch in the closed position and enable a stop.

Advantageously, stamping is introduced for the side edges, which have a Y-shaped course in cross-section. As a result, the outer and inner wall are moved towards each other in equal measures when producing the stamping, whereby a closed course of the side edge is also formed.

The tab is preferably provided adjacent to the end edge of the side wall or loading hatch or in an upper corner region of the end edge of the side wall or the loading hatch or between a central region of the side edge up to the upper corner region of the side edge of the side wall or loading hatch. The adjustment of the position can also take place depending on the wall thicknesses of the side wall and/or the end edges on the side wall or loading hatch in order to enable, on the one hand, an opening and closing of the loading hatch when overcoming a slight holding force and, on the other hand, to securely hold the loading hatch in the closed position during transportation.

Preferably, the tab is provided as a stop and the upper corner region of the side wall or the side edge of the side wall is provided in the upper corner region of the side wall as a locking element. According to a first embodiment, the tab can also extend along an inside of the side wall and the side edge or the side edge of the side wall allocated to the upper corner region is distanced therefrom in the direction of the outside of the side wall. Thus, the internal tab serves as a stop and the side edge of the side wall as a locking element, which can be transferred into the open or closed position when opening and closing the loading hatch after overcoming a holding force. Alternatively, this arrangement can also be provided in reverse, i.e. the tab is applied to an outside of the loading hatch that is adjacent to the side edge of the loading hatch. The side edge of the side wall then serves as the locking element.

Advantageously, multi-layer plates are used for the at least one side wall of the side wall arrangement, said plates preferably being formed from three or more layers. The end edges therefore have a wall thickness which emerges from the number of layers and the material thickness of the individual layers.

The object underlying the invention is solved by means of a method for the production of a side wall arrangement which consists of several side walls that are able to be connected to one another by joints or are connected to one another and form a closed ring that can be folded together, wherein at least one stamping is introduced into the side wall to form the loading hatch, by means of which stamping a hinge for flexibly connecting the loading hatch to the side wall is produced and surface sections extending from the hinge up to the end edge of the side wall having at least one stamping are introduced, by means of which the wall thickness is reduced, wherein a separation cut is introduced into the surface sections by means of the stamping, wherein at least one side edge of the side wall or at least one side edge of the loading hatch is provided with a tab which is aligned at a distance from the side edge and extends beyond the opposing side edge of the loading hatch or side wall. As a result, a cost-effective production of such a side wall arrangement is possible. Fewer work steps are needed to produce the side wall having a loading hatch for a side wall arrangement. By introducing stamping to form the surface sections, which preferably extend from the hinge of the loading hatch to be formed up to the end edge of the side wall or the ring, a pretension is introduced into the side wall or the ring which can be relieved by the subsequent introduction of a separation cut in the region of the surface sections for producing the pivotable loading hatch. As a result, the upper corner regions of the side wall, which are formed by the side edge and end edge of the side wall that are adjacent to each other, extend at least slightly into the open-ended opening such that this upper corner region of the side wall prevents the loading hatch falling inwards because of the respective abutting upper corner region of the loading hatch with a closing movement of the loading hatch. The respective upper corner region of the loading hatch is bordered by the side edge and the end edge of the loading hatch.

It is preferred that the tab is formed by stamping that is introduced into the side wall or loading hatch on one side. Preferably, an outside of the tab is flush with the outside of the side wall or the tab. As a result, such a tab can be moulded by means of thermal deformation on the existing side wall or loading hatch. In doing so, the tab can be moulded directly on the side wall or loading hatch by a further step of stamping subsequent to the stamping for the hinge of the surface sections or a following stamping of the hinge and the surface sections.

Furthermore, the side edge of the side wall or loading hatch extends from an end edge of the side wall up to the hinge, and the stamping is introduced over the entire length of the side edge on the side wall and the loading hatch. As a result, the side edge of the side wall and the loading hatch can be closed and/or additionally stiffened. In addition, a shutter can be integrated into the side wall as a result of the reduced wall thickness, said shutter not protruding beyond the material thickness of the side wall.

Furthermore, the surface sections are preferably introduced for forming the side edges and, in a work step, the hinge is introduced into the side wall. In doing so, for example, a loading hatch with a shutter can be introduced in the side wall in only three work steps. In a first work step, the hinge and the stamping of the surface sections are introduced in the region of the subsequent separation cut. In a second work step, the separation cut is made in the surface sections. In a third work step, the tab is stamped. Subsequently, the loading hatch can be held in a closed position, wherein an upper corner region of the end edge of the side walls forms a stop for the loading hatch and, on the other hand, the tab holds the loading hatch in the closed position.

Furthermore, the loading hatch is transferred into a position outside the closed position for applying the tab to the loading hatch or the side wall. As a result, a flat layer for the side wall or the tab is created in order to subsequently introduce the tab by means of stamping or fix the tab to the side wall or loading hatch.

The object underlying the invention is further solved by means of a container, in particular a pallet container, having a base and a cover and a side wall arrangement that can be arranged therebetween in which the side wall arrangement is formed according to one of the previous embodiments.

Figure 2:
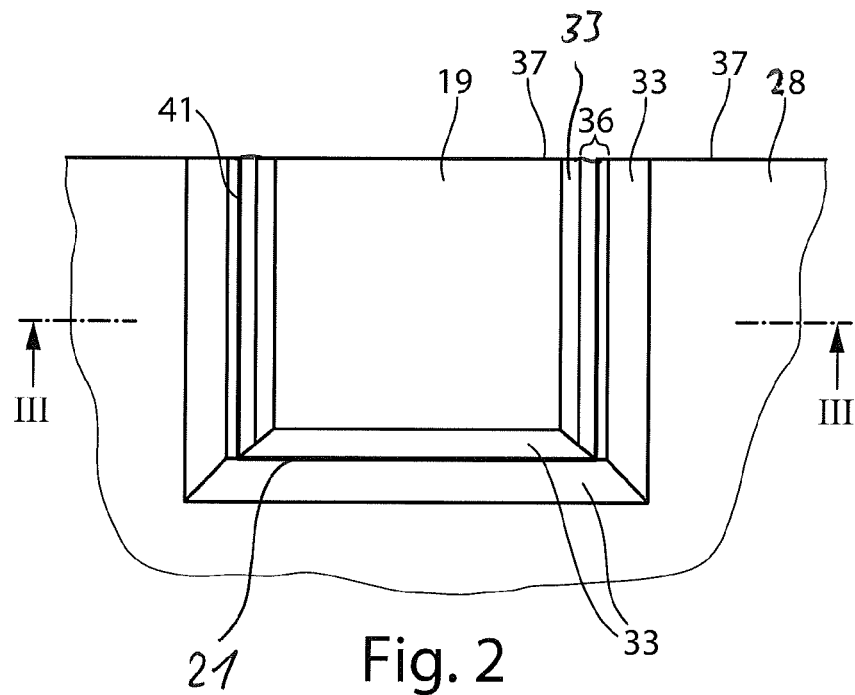
Figure 3:
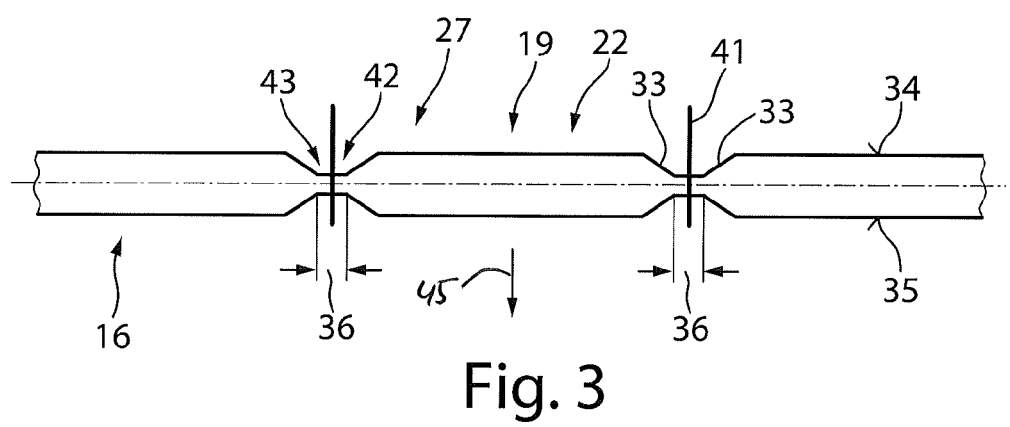
Figure 4:
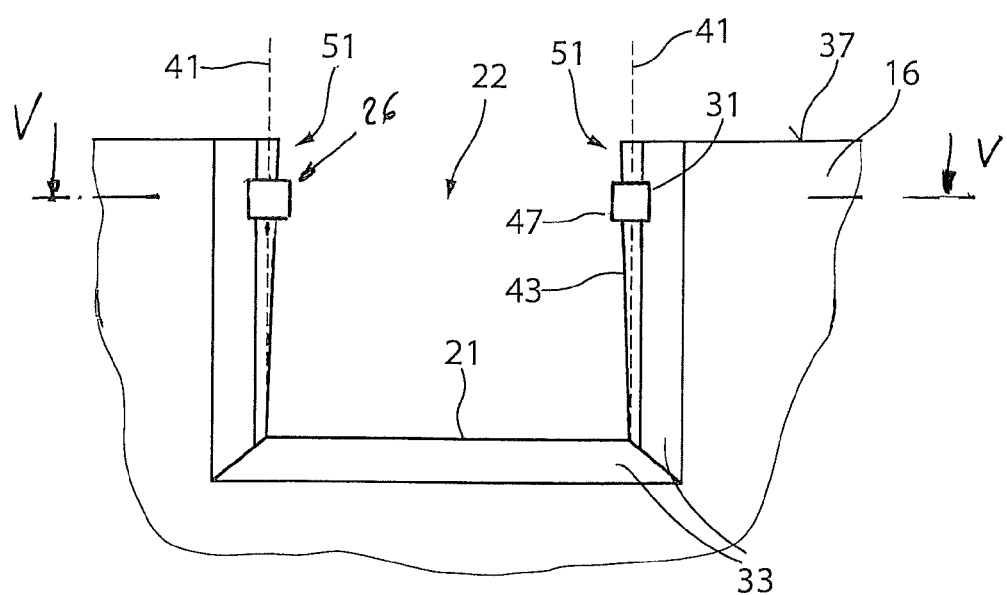
Figure 5:
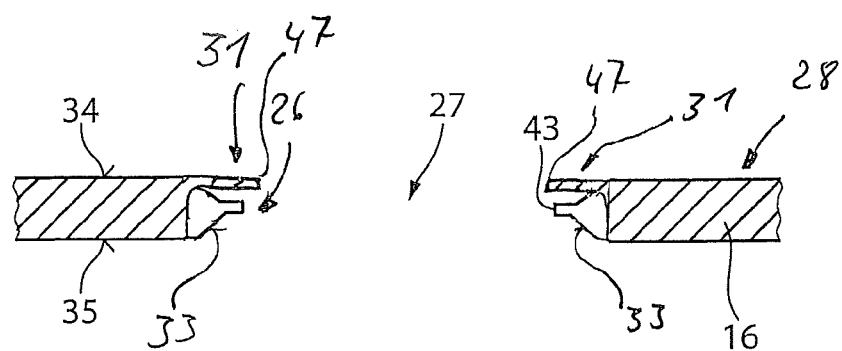
Figure 6:
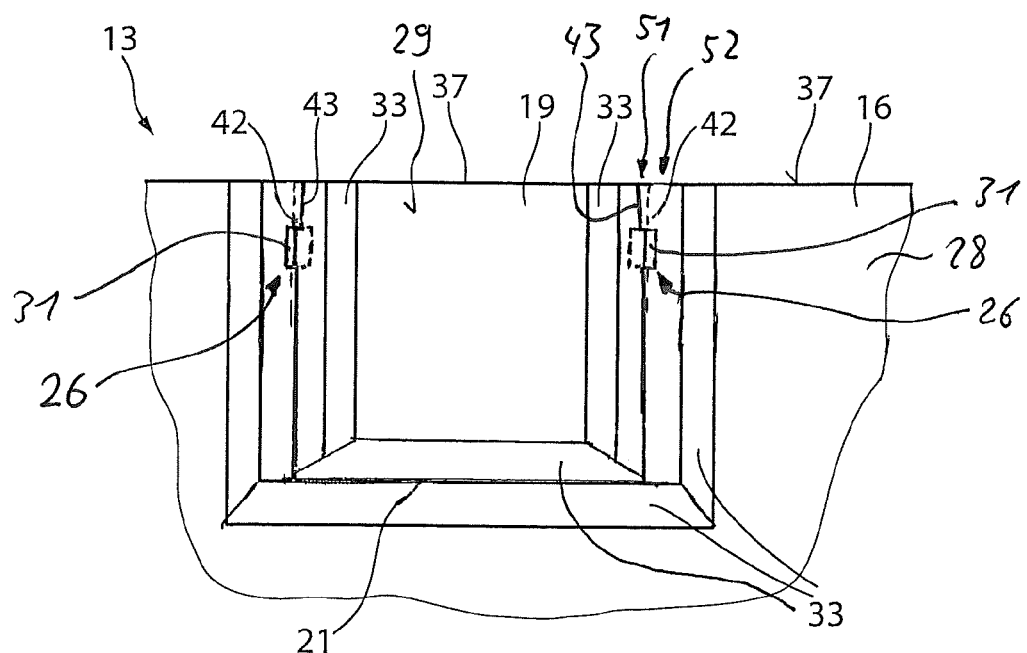
Figure 7:
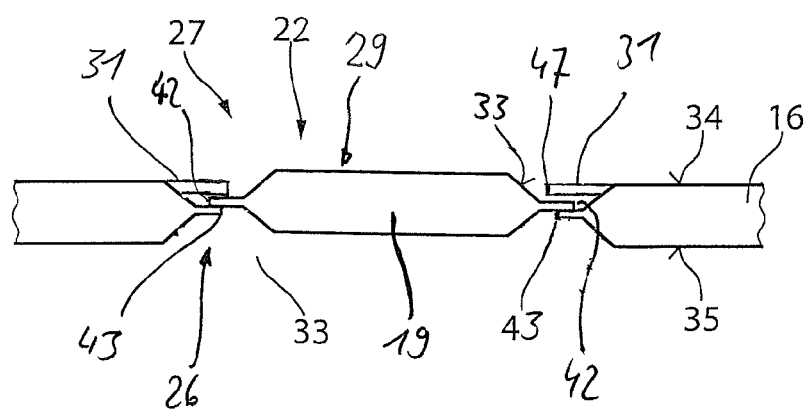
Figure 8:
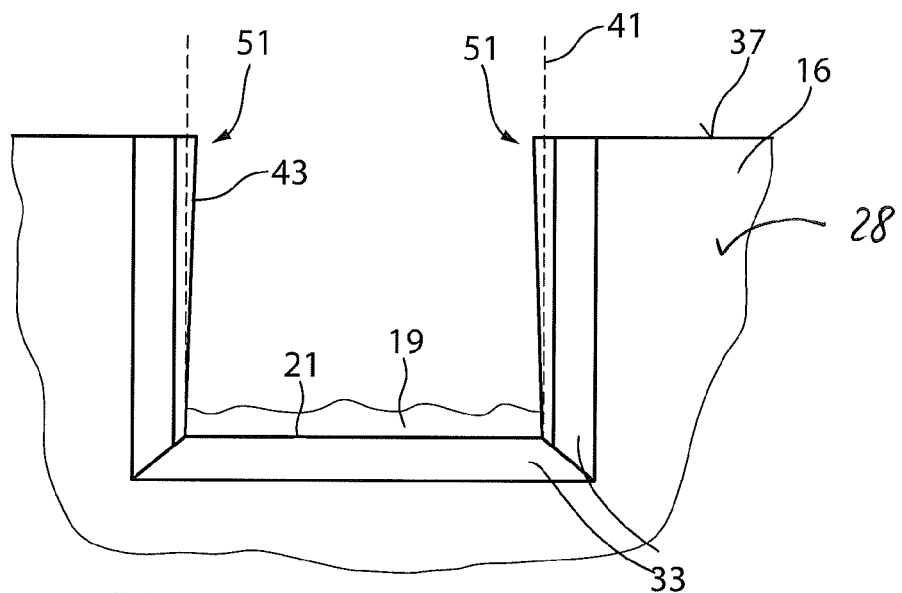
Figure 9:
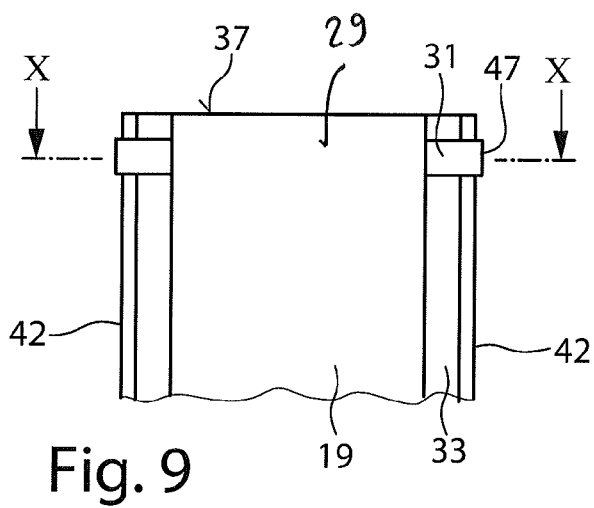
Figure 10:
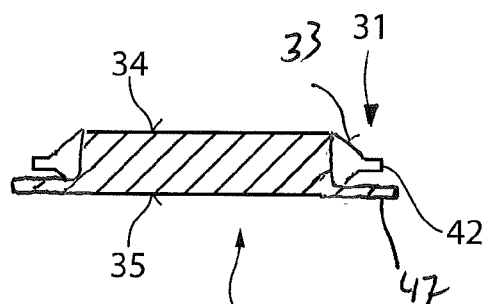

The invention and further advantageous embodiments and developments thereof are described and explained in more detail below by means of the examples depicted in the drawings. The features that can be seen in the description and the drawings can be applied individually or together in any desired combination according to the invention. They show:

FIG. 1 a perspective view of a container having a side wall arrangement and a loading hatch provided in a side wall, FIG. 2 a schematic view of a side wall in a first work step for producing a loading hatch, FIG. 3 a schematic sectional view along the line III-III in FIG. 2, FIG. 4 a schematic side view of the side wall according to FIG. 2 after introducing a tab, FIG. 5 a schematic sectional view along the line V-V in FIG. 4, FIG. 6 a schematic enlarged side view of the side wall having the loading hatch and the shutter in a closed position, FIG. 7 a schematic view from above of an end edge of the side wall and loading hatch, FIG. 8 a schematic view of an alternative embodiment to FIG. 4, FIG. 9 a schematic side view of the loading hatch that is not depicted in more detail in the embodiment in FIG. 8, and FIG. 10 a schematic sectional view along the line X-X in FIG. 9.

An isometric depiction of a container 11, in particular a collapsible container 11, is depicted in FIG. 1. This container 11 comprises a base 12 that is formed in the shape of a pallet, for example. This base 12 receives a side wall arrangement 13 which is formed from several side walls 16, for example from four side walls 16. These four side walls 16 are connected to one another along their narrow side by means of a joint 18 and form a sleeve or a ring 14. This ring 14 is preferably able to be folded. For example, an M-fold or similar can be provided. A cover 17 is provided on the ring 14, which cover 17 closes the container 11. As a result, a closed transport container can be created that, moreover, is also able to be stacked.

The cover 17 is preferably formed to be hood-shaped. In the case of the transport container 11, this has the advantage that the side wall arrangement 13, in particular the folded together ring 14 that rests on the base 12, is covered by the cover 17 such that a small transportation volume of the container 11 for return transportation is possible. Such containers 11 preferably consist of plastic, in particular plastic that can be recycled. The side walls 16 can be formed from two or three-layer plastic films or plastic plates, such as hollow chamber plates or ribbed plates with flat outsides, for example.

The side wall 16 has a loading hatch 19 in an opening 27, said loading hatch 19 bordering an upper end edge of the side wall 16. The loading hatch 19 is flexibly connected to the side wall 16. Preferably, a hinge 21, in particular a film hinge, is formed. The loading hatch 19 can be transferred from the closed position 22 depicted in FIG. 1 into an open position 23 that is shown in dashes or an unloading position for transport goods contained therein in order to enable a simple removal of the parts stored therein or a simple loading and unloading.

The loading hatch 19 is held in the closed position 22, for example, by shutters 26. These shutters 26 are provided close to the upper end edge 37 of the side wall 16.

Additionally, two opposite halves of a Velcro strip 24, 25 can be provided on the loading hatch 19 adjacent to the shutters 26, the Velcro strips 24, 25 interlocking with one another in order to fix the loading hatch 19 in an open position 23.

The two shutters 26 can be fixed in a wall section 28 of the side walls 16 according to a first embodiment. Alternatively, the shutters 26 can also be fixed on a wall section 29 of the loading hatch 19. The shutter 26 that is subsequently described in more detail is arranged in a stationary manner in the wall section 28, 29.

A first embodiment of the shutter 26 is described in FIGS. 2 to 7.

In FIGS. 2 and 3, a schematic side view and a view from above of the side wall 16 after carrying out a first method step for producing the shutter 26 according to FIG. 1 are depicted.

FIGS. 4 and 5 show a schematic side view and a schematic sectional view along the line V-V in FIG. 4 and the formation of a tab 31 for a shutter 26 after a second and a third work step. In FIGS. 6 and 7, a schematic side view and a top view of a side wall having a loading hatch 19 held in the closed position by the shutter 26 are depicted.

To produce a side wall arrangement 13, a multi-layer plate is preferably provided for forming the side walls 16. A three-layer plate is preferably provided; a so-called hollow chamber plate or structure chamber plate which consists of two flat outer layers and has a layer lying therebetween that comprises projections formed from a plane on one or two sides. To produce the loading hatch 19 and the shutter 26, the hinge 21 is introduced in the side wall 16 by means of a stamping tool, preferably in a first work step. Preferably, hot stamping is carried out. When installing the hinge 21, slants 33 are formed which bridge a reduced wall thickness in the region of the hinge 21 relative to an inside 34 and an outside 35 of the side wall 16.

At the same time, to introduce the hinge 21 or in a subsequent work step, surface sections 36 are introduced which are reduced relative to the wall thickness of the side wall 16. These surface sections 36 are preferably aligned at a right angle to the hinge 21. These surface sections 36 extend from the respective end region of the hinge 21 up to the end edge 37 of the side wall 16 and the loading hatch 19. In turn, slants 33 are joined on the side of the surface sections 36, by means of which slants 33 a transition from a reduced wall thickness of the side wall 16 and the loading hatch 19 in comparison to adjacent wall sections 28, 29 of the side wall 16 and the loading hatch 19 is formed. Preferably, the surface sections 36 of an inside 34 and an outside 35 are introduced equally such that a symmetrical design in terms of the slants 33 is created. When introducing the surface sections 36, the side wall 16 and the loading hatch 19 are stamped in this region. For example, with a three-layer plate, the central structured layer is pressed together and abuts flush with an outer and an inner layer 34, 35. The thickness of the surface section 36 preferably corresponds to the material strength of the respective number of layers of the side wall 16 or can be further reduced by additionally introducing heat and/or pressure.

As a result of this introduction of the surface sections 36 and, preferably, the formation of the slants 33, an internal tension or pretension is formed in this region because of the material displacement.

After introducing the stamping for the hinge 21 and the surface sections 36, a separation cut 41 is introduced by means of a knife or a hot blade, said separation cut 41 extending within the surface sections 36. This separation cut 41 can also have the length of surface sections 36. Side edges 42 of the loading hatch 19 and side edges 43 of the side wall 16 are formed by means of introducing the separation cut 41. The side edges 42, 43 are each allocated to one another. As a result, the loading hatch 19 can be pivoted in the opening direction. The opening direction can emerge from the image plane or is depicted in FIG. 3 by the arrow 45.

In a subsequent work step, the tab 31 is stamped according to the embodiment depicted in FIGS. 4 and 5. The loading hatch 19 is pivoted out of the closed position, such that the opening 27 is freely accessible. The stamping tool acts on an outside 35 of the side wall arrangement 13 or the side wall 16 such that a material deformation in the direction of the inside 34 of the side wall 16 takes place.

As a result of this thermal deformation, a break of the side edge 43 in this region can take place by the tab 31 being stamped. Preferably, the tab 31 abuts with its outside flush to the inside 34 of the side wall 16. The length of the tab 31, in proportion to the length of the side edge 43, which is determined by a distance between the hinge 21 and the end edge 37 of the side wall 16, is several times smaller. Preferably, the length of the tab 31 is formed to be smaller than a quarter or a fifth of the length of the side edges 43.

The width of the tab 31 is formed in such a way that a front tab edge 47, seen in a top view, is congruent with the side edge 43 or, moreover, projects slightly into the opening 27.

The tab 31 lies with its tab edge 47 on a plane that is spaced apart in parallel to a plane on which the side edges 43 of the side wall 16 lie. As a result, a distance or a clearance between the tab edge 47 and the end edge 43 can be formed, seen in the sectional view according to FIG. 5, said distance being larger than the thickness of the side edge 43 after the stamping of the surface sections 36. As a result, the side edge 42 of the loading hatch 19 can be positioned between the tab edge 47 of the tab 31 and the side edge 43 of the side wall 16 in a closed position. Since, in the region of the tab 31, the side edges 43 are broken, the tab 31 extends lengthways corresponding to the break of the side edge 43. The shutter 26 is preferably formed by the tab 31 and the side edge 42, 43 allocated to this or the side edge 42, 43 which is broken by the stamping of the tab 31. The same applies if the tab 31 is allocated to the side edges 42, 43 and is fixed on the side wall 16 or the loading hatch 19. Then, the side edge 42, 43 is not broken, but can be broken.

As a result of the stamping to form the surface sections 36, as is depicted in FIGS. 2 and 3, there is an easing of tension of the side wall 16 after introducing the separation cuts 41 such that the upper corner regions 51 aligned relative to one another move at least slightly into the opening 27. As a result, there is a trapeze-shaped opening 47 or an almost trapeze-shaped opening 47. The side edges 43 are inclined towards one another, starting from the hinge 21, seen in the direction of the end edge 37, as depicted by the course of the side edges 43 relative to the separation cut 41.

The loading hatch 19 can remain the same in terms of the distance of the end edges 42 such that these are formed parallel to one another. Because of the pretension introduced by the surface sections 36, the end edges 42 of the loading hatch 19 can each move slightly outwards, i.e. the end edge 37 of the loading hatch 19 lengthens slightly and becomes larger than the opening width of the opening 27 when introducing the separation cuts 41.

In FIG. 6, a schematic side view of the shutter 26 and, in FIG. 7, a top view of the end edge 37 of the side wall 16 and the loading hatch 19 are depicted in a closed position 22.

When transferring the loading hatch 19 from the open position 23 into the closed position 22, which is depicted in FIGS. 6 and 7, the end edges 42 of the loading hatch 19 are guided past on the respective side edges 43 of the side wall 16, in particular the section of the side edge 43 in the upper corner region 51 of the side wall 16, by overcoming a holding force or return force. Subsequently, the further movement of the loading hatch 19 in the closing direction is prevented by the tab 31, which preferably serves as a stop. The end edges 42 of the loading hatch 19 lie between the upper corner region 51 of the side wall 16 with the tab 31. In addition, an upper corner region 52 of the loading hatch 19 rests on the upper corner region 51 of the side wall 16 adjacent to the side edge 42 of the loading hatch. This resting on one another is then further strengthened when the corner regions 52 of the loading hatch 19 also move outwards at least slightly. As a result, the inwards pivoting of the loading hatch 19 is prevented. When opening the loading hatch 19 for transferring into the open position 23, the loading hatch 19 is released after overcoming the holding force of the side edge 43 of the side wall 16 and can be transferred into the open position 23.

From the top view of the side wall 16 and the loading hatch 19, it can be seen that, in the closed position 22, the loading hatch 10 lies with the outside 35 virtually flush with the outside 35 of the side wall 16.

Alternatively, instead of the arrangement depicted in FIGS. 5 and 7, in which the tab 31 is arranged to be flush with the inside 34 of the side wall 16, this tab 31 can be moulded such that it is adjacent to or flush with the outside 35 of the side wall 16. For this alternative embodiment, the same applies as for the arrangement described above. In this alternative arrangement, the tab 31 does not serve as a stop against falling inwards, but rather as a locking element. The side edges 43 of the side wall 16 then prevent the loading hatch 19 from falling inwards and thus serve as a stop.

An alternative embodiment of the shutter to that in FIGS. 6 and 7 is depicted in FIGS. 8 to 10, which is produced after the work steps according to FIGS. 2 to 5.

This shutter 26 differs from the embodiment described above only in that the tab 31 is arranged on the loading hatch 31 and not on the end wall 16. Here, the tab 31 is stamped on the loading hatch 19 in such a way that the tab 31 is arranged to be offset relative to the end edges 42 of the loading hatch 19 in the direction of the outside 35. Preferably, the tab 31 is provided to be flush with the inside 34. In general, the embodiments and advantages and the alternative embodiments of the shutter 26 described above according to FIGS. 2 to 7 apply analogously to the embodiment according to FIGS. 8 to 10.

The invention claimed is:

1. A side wall arrangement for a container, the side wall arrangement comprising:

several side walls that are each configured to extend upright in a vertical direction between a bottom edge and a top edge of each side wall, and are configured to form a closed ring, wherein a loading hatch is provided on at least one side wall of the several side walls, said loading hatch being configured to close an opening in the at least one side wall when in a closed position, or open the opening when in an open position, wherein the loading hatch is flexibly connected to the at least one side wall by way of a hinge, and wherein:

the loading hatch has a unitary side edge portion, the side edge portion having a reduced wall thickness relative to an adjacent portion of the loading hatch, the at least one side wall has a unitary side wall edge portion having a peripheral edge that bounds an upwardly extending side of the opening, the side wall edge portion having a reduced wall thickness relative to an adjacent portion of the side wall, wherein the peripheral edge extends upwardly in a slanted direction relative to the vertical direction and relative to a horizontal direction of the at least one sidewall, such that an upper end of the peripheral edge is closer to a center of the opening than a lower end of the peripheral edge, and such that an inwardly protruding upper corner region is formed by the side wall edge portion corresponding with an upper part of the peripheral edge;

an upper part of the side edge portion of the loading hatch and the upper corner region of the side wall edge portion laterally overlap with each other when the loading hatch is in the closed position, at least one tab is provided on: (i) the upper corner region of the side wall edge portion of the at least one side wall, or (ii) the upper part of the side edge portion of the loading hatch, the loading hatch is movable into the open position or the closed position when opening and closing the loading hatch after overcoming a holding force produced by the tab, or after overcoming a holding force produced by the upper part of the side edge portion of the loading hatch and the upper corner region of the side wall edge portion laterally overlapping with each other, and in the closed position, (i) when the at least one tab is provided on the upper corner region of the side wall edge portion, the side edge portion of the loading hatch is positioned between the upper corner region of the side wall edge portion and the tab, or (ii) when the at least one tab is provided on the upper part of the side edge portion of the loading hatch, the upper corner region of the side wall edge portion is positioned between a portion of the upper part of the side edge portion of the loading hatch and the tab.

2. The side wall arrangement according to claim 1, wherein the at least one tab is fixable on an outside or an inside of the at least one side wall or the loading hatch, or the at least one tab is stamped on the outside or the inside of the at least one side wall or the loading hatch.

3. The side wall arrangement according to claim 1, wherein:

(i) when the at least one tab is provided on the side wall edge portion of the at least one side wall, the at least one tab is aligned in parallel to the side wall edge portion such that the at least one tab is arranged on a parallel plane to the side wall edge portion, or (ii) when the at least one tab is provided on the side edge portion of the loading hatch, the at least one tab is aligned in parallel to the side edge portion such that the at least one tab is arranged on a parallel plane to the side edge portion.

4. The side wall arrangement according to claim 1, wherein:

(i) when the at least one tab is provided on the side wall edge portion of the at least one side wall, the side wall edge portion of the at least one side wall is broken in a region of the at least one tab or to the extent of a length of the at least one tab, (ii) when the at least one tab is provided on the side edge portion of the loading hatch, the side edge portion of the loading hatch is broken in the region of the at least one tab or to the extent of the length of the at least one tab.

5. The side wall arrangement according to claim 1, wherein:

(i) when the at least one tab is provided on the side wall edge portion of the at least one side wall, the side edge portion of the loading hatch extends continuously from the hinge up to an end edge of the loading hatch, (ii) when the at least one tab is provided on the side edge portion of the loading hatch, the side wall edge portion the at least one side wall extends continuously from the hinge up to an end edge of the at least one side wall.

6. The side wall arrangement according to claim 1, wherein stamping of the side edge portion of the loading hatch forms a tapered surface that tapers inwardly in a thickness direction of the loading hatch from the adjacent portion of the loading hatch toward a peripheral edge of the side edge portion of the loading hatch; and wherein stamping of the side wall edge portion of the at least one side wall forms a tapered surface that tapers inwardly in a thickness direction of the at least one side wall from the adjacent portion of the side wall toward the peripheral edge of the side wall edge portion.

7. The side wall arrangement according to claim 1, wherein:

(i) when the at least one tab is provided on the side wall edge portion of the at least one side wall, the tab is adjacent to an end edge of the at least one side wall, or is stamped in an upper corner region of the at least one side wall, or is positioned between a central region of the at least one side wall and the end edge of the at least one side wall; or (ii) when the at least one tab is provided on the side edge portion of the loading hatch, the tab is adjacent to an end edge of the loading hatch, or is stamped in an upper corner region of the loading hatch, or is positioned between a central region of the loading hatch and the end edge of the loading hatch.

8. The side wall arrangement according to claim 1, wherein when the loading hatch is moved to the closed position, the tab is provided as a stop and respective portions of the side edge portion of the loading hatch and the side wall edge portion of the at least one side wall that laterally overlap with each other are provided as locking elements.

9. The side wall arrangement according to claim 1, wherein the at least one side wall is formed from a multi-layer plate, and has a wall thickness that is formed from the number of layers of the multi-layer plate.

10. The side wall arrangement according to claim 1, wherein the side wall edge portion of the at least one side wall is introduced by symmetrically stamping the inside and outside of the at least one side wall and the loading hatch.

11. The side wall arrangement according to claim 9, wherein the reduced wall thickness of the side wall edge portion of the at least one side wall and the reduced wall thickness of the side edge portion of the loading hatch are formed from the material thickness of the layers of the multi-layer plate.

12. The side wall arrangement according to claim 1, wherein the container is a pallet container.

13. The side wall arrangement according to claim 1,
wherein the opening in the at least one side wall is bounded on three sides, including a first upwardly extending side, a second upwardly extending side opposite the first upwardly extending side, and a lower horizontally extending side connecting the first and second upwardly extending sides, and wherein the opening opens through the top edge of the at least one side wall,
wherein the peripheral edge of the side wall edge portion is a first peripheral edge of a first side wall edge portion that bounds an entirety of the first upwardly extending side of the opening, and wherein the upper corner region is a first upper corner region;
wherein the side wall arrangement further includes a unitary second side wall edge portion having a second peripheral edge that bounds an entirety of the second upwardly extending side of the opening, the second peripheral edge extending upwardly in a slanted direction relative to the vertical direction and relative to the horizontal direction of the at least one sidewall, such that an upper end of the second peripheral edge is closer to a center of the opening than a lower end of the second peripheral edge, and such that a second inwardly protruding upper corner region is formed by the second side wall edge portion corresponding with an upper part of the second peripheral edge,
wherein the unitary side edge portion of the loading hatch is a first side edge portion, the loading hatch including a unitary second side edge portion opposite the first side edge portion, the second side edge portion having a second upper part that laterally overlaps with the second upper corner region of the second side wall edge portion when the loading hatch is in the closed position;
wherein the hinge is connected to the at least one side wall at a pivot axis that corresponds with the lower horizontally extending side of the opening, the hinge permitting movement of the loading hatch about the pivot axis between the open and closed positions (i) after overcoming a holding force produced by the tab, or (ii) after overcoming holding forces produced by the respective upper parts of the first and second side edge portions of the loading hatch overlapping with the respective first and second upper corner regions of the side wall edge portions.

14. The side wall arrangement according to claim 13, wherein the loading hatch is unitary with the at least one side wall, said hinge being configured as a living hinge that is formed in the at least one side wall, and wherein the side wall arrangement is a multi-layered plastic material; and
wherein the stamping of the side edge portion of the loading hatch forms a tapered region that, when viewed in cross-section, has a Y-shaped course; and
wherein the stamping of the side wall edge portion of the at least one side wall forms a tapered region that, when viewed in cross-section, has a Y-shaped course.

15. A method for producing a side wall arrangement for a container, in which the side wall arrangement comprises: several side walls that are configured to form a closed ring, wherein a loading hatch is provided on at least one side wall of the several side walls, said loading hatch being configured to close an opening in the at least one side wall when in a closed position, or open the opening when in an open position, and wherein the loading hatch is flexibly connected to the at least one side wall by way of a hinge, wherein: the loading hatch has a unitary side edge portion, the side edge portion having a reduced wall thickness relative to an adjacent portion of the loading hatch; the at least one side wall has a unitary side wall edge portion that bounds at least a portion of the opening, the side wall edge portion having a reduced wall thickness relative to an adjacent portion of the side wall; the side edge portion of the loading hatch and the side wall edge portion of the at least one side wall laterally overlap with each other when the loading hatch is in the closed position; at least one tab is provided on: (i) the side wall edge portion of the at least one side wall, or (ii) the side edge portion of the loading hatch; the loading hatch is movable into the open position or the closed position when opening and closing the loading hatch after overcoming a holding force produced by the tab, or after overcoming a holding force produced by the side edge portion of the loading hatch and the side wall edge portion of the at least one side wall laterally overlapping with each other; and in the closed position, (i) when the at least one tab is provided on the side wall edge portion of the at least one side wall, the side edge portion of the loading hatch is positioned between a portion of the side wall edge portion and the tab, or (ii) when the at least one tab is provided on the side edge portion of the loading hatch, the side wall edge portion of the at least one side wall is positioned between a portion of the side edge portion of the loading hatch and the tab, the method comprising:
stamping the at least one side wall such that the hinge for flexibly connecting the loading hatch to the at least side wall is produced, and wherein the stamping reduces the wall thickness of the at least one side wall in at least one section of the at least one side wall,
introducing a separation cut at the at least one section of the at least one side wall having the reduced wall thickness, wherein the separation cut forms the unitary side wall edge portion of the at least one side wall, and the unitary side edge portion of the loading hatch, wherein the separation cut extends from an end edge of the at least one side wall, and wherein the separation cut at the at least one section having the reduced wall thickness enables the side edge portion of the loading hatch and the side wall edge portion of the at least one side wall to laterally expand such that they laterally overlap with each other when the loading hatch is in the closed position,
providing the at least one tab on: (i) the side wall edge portion of the at least one side wall, or (ii) the side edge portion of the loading hatch, such that, in the closed position, (i) when the at least one tab is provided on the side wall edge portion of the at least one side wall, the side edge portion of the loading hatch is positioned between a portion of the side wall edge portion and the tab, or (ii) when the at least one tab is provided on the side edge portion of the loading hatch, the side wall edge portion of the at least one side wall is positioned between a portion of the side edge portion of the loading hatch and the tab;
wherein the side wall edge portion has a peripheral edge that bounds an entirety of an upwardly extending side of the opening, wherein the peripheral edge extends upwardly in a slanted direction relative to the vertical direction and relative to the top edge of the at least one sidewall, such that an upper end of the peripheral edge is closer to a center of the opening than a lower end of the peripheral edge, and such that an inwardly protruding upper corner region is formed by the side wall edge portion corresponding with an upper part of the peripheral edge.

16. The method according to claim 15, wherein the at least one tab is formed by a one-sided stamping that is introduced into the at least one side wall or the loading hatch, and an outside of the at least one tab is flush to an outside of the at least one side wall, or an inside of the at least one side wall, or the loading hatch.

17. The method according to claim 15, wherein the side wall edge portion of the at least one side wall, or the side edge portion of the loading hatch, extends from the end edge of the at least one side wall to an end region of the hinge, and the at least one section formed by stamping extends across the entire length of the side wall edge portion of the at least one side wall and the side edge portion of the loading hatch.

18. The method according to claim 15, wherein the at least one section having the reduced wall thickness formed by stamping and the hinge are formed in the at least one side wall in a communal work step.

19. The method according to claim 15, wherein the loading hatch is moved into a position outside the closed position for applying the at least one tab to the side wall edge portion of the at least one side wall, or to the side edge portion of the loading hatch.

20. A container having a base and a cover between which the side wall arrangement according to claim 1 is arrangeable, wherein the side wall arrangement is fittable on the base and the cover is placeable on the side wall arrangement.

* * * * *